United States Patent
Yoon et al.

(10) Patent No.: US 9,646,176 B2
(45) Date of Patent: May 9, 2017

(54) METHOD FOR ENCRYPTING DATABASE

(71) Applicant: TmaxData Co., Ltd, Gyeonggi-Do (KR)

(72) Inventors: Jeong Il Yoon, Gyeonggi-Do (KR); Sang Young Park, Gyeonggi-Do (KR)

(73) Assignee: TmaxData Co., Ltd. (KR)

( * ) Notice: Subject to any disclaimer, the term of this patent is extended or adjusted under 35 U.S.C. 154(b) by 20 days.

(21) Appl. No.: 14/733,778

(22) Filed: Jun. 8, 2015

(65) Prior Publication Data
US 2016/0283749 A1    Sep. 29, 2016

(30) Foreign Application Priority Data
Mar. 24, 2015    (KR) .................. 10-2015-0040593

(51) Int. Cl.
| | | |
|---|---|---|
| G06F 21/00 | (2013.01) | |
| G06F 21/78 | (2013.01) | |
| G06F 21/64 | (2013.01) | |
| G06F 21/62 | (2013.01) | |
| H04L 9/08 | (2006.01) | |
| H04L 9/32 | (2006.01) | |

(52) U.S. Cl.
CPC .......... *G06F 21/78* (2013.01); *G06F 21/6209* (2013.01); *G06F 21/64* (2013.01); *H04L 9/0872* (2013.01); *H04L 9/3239* (2013.01)

(58) Field of Classification Search
CPC ....................................................... G06F 21/78
See application file for complete search history.

(56) References Cited

U.S. PATENT DOCUMENTS

| | | | | |
|---|---|---|---|---|
| 7,111,005 | B1 * | 9/2006 | Wessman | G06F 21/604 |
| 8,949,603 | B2 * | 2/2015 | Moon | G06F 21/6227 |
| | | | | 713/168 |
| 8,997,041 | B2 | 3/2015 | Lee | |
| 9,071,884 | B2 | 6/2015 | Joung | |
| 9,275,512 | B2 * | 3/2016 | Deng | G07F 17/323 |

(Continued)

FOREIGN PATENT DOCUMENTS

| | | |
|---|---|---|
| KR | 1020020082851 | 10/2002 |
| KR | 10-2006-0037196 | 5/2006 |

(Continued)

OTHER PUBLICATIONS

Cyran, Michele, "Oracle® Database Concepts 10g Release 2 (10.2) B14220-02", 542 Pages. Oct. 2005. Copyright 1993, 2005, Oracle.

(Continued)

*Primary Examiner* — Ali Shayanfar
(74) *Attorney, Agent, or Firm* — Rutan & Tucker LLP (57) ABSTRACT

According to an embodiment of the present invention, a computer program stored in a computer-readable medium for encrypting a data value included in a data table stored in a memory and storing the encrypted data value in a persistent storage medium is disclosed. The computer program allows a computer to perform steps including: generating an encrypted data value based on the data value included in the data table stored in a memory; generating a hash value that matches the encrypted data value at least partially based on the data value and positional information of the data value; and determining to write the encrypted data value and the hash value on a persistent storage medium.

11 Claims, 8 Drawing Sheets

(56) References Cited

U.S. PATENT DOCUMENTS

| | | |
|---|---|---|
| 2001/0034795 A1 | 10/2001 | Moulton et al. |
| 2001/0037323 A1 | 11/2001 | Moulton et al. |
| 2001/0042221 A1 | 11/2001 | Moulton et al. |
| 2001/0044879 A1 | 11/2001 | Moulton et al. |
| 2002/0010797 A1 | 1/2002 | Moulton et al. |
| 2002/0048284 A1 | 4/2002 | Moulton et al. |
| 2002/0152218 A1 | 10/2002 | Moulton |
| 2004/0148306 A1 | 7/2004 | Moulton et al. |
| 2004/0225655 A1 | 11/2004 | Moulton et al. |
| 2005/0022052 A1 | 1/2005 | Moulton et al. |
| 2005/0120137 A1 | 6/2005 | Moulton et al. |
| 2008/0133935 A1* | 6/2008 | Elovici ............... G06F 21/6227 713/193 |
| 2010/0303229 A1* | 12/2010 | Unruh .................. H04L 9/0637 380/28 |
| 2011/0246369 A1* | 10/2011 | de Oliveira .......... G06Q 20/382 705/64 |
| 2012/0166419 A1* | 6/2012 | Enoki ............... G06F 17/30902 707/714 |
| 2013/0091357 A1 | 4/2013 | Moon |
| 2014/0108459 A1* | 4/2014 | Gaza ................. G06F 17/30584 707/792 |
| 2014/0237231 A1* | 8/2014 | Spalka ................ G06F 21/6218 713/165 |
| 2014/0297651 A1* | 10/2014 | Shadmon .......... G06F 17/30321 707/741 |
| 2015/0193816 A1* | 7/2015 | Toupet ............... G06Q 30/0251 705/14.43 |
| 2016/0094527 A1* | 3/2016 | Roberts, Jr. ......... H04L 63/0435 713/158 |
| 2016/0189182 A1* | 6/2016 | Sullivan ............. G06Q 30/0204 705/7.33 |

FOREIGN PATENT DOCUMENTS

| | | |
|---|---|---|
| KR | 10-2006-0058546 | 5/2006 |
| KR | 1020130039354 | 4/2013 |
| KR | 10-1330071 | 11/2013 |
| KR | 10-1341944 | 12/2013 |

OTHER PUBLICATIONS

Huey, Patricia, "Oracle® Database 2 Day + Security Guide, 11g Release 2 (11.2) E10575-09", 124 Pages. Nov. 2013. Copyright 2006, 2013, Oracle.

Office Action issued in co-pending Korean Patent Application No. 120030349901 mailed Feb. 1, 2016 (5 pgs).

Office Action issued in co-pending Korean Patent Application No. 120030349901 mailed Jun. 3, 2015 (5 pgs).

Office Action issued in co-pending Korean Patent Application No. 120030349901 mailed Oct. 2, 2015 (5 pgs).

* cited by examiner

METHOD FOR ENCRYPTING DATABASE

RELATED APPLICATIONS

This application is related to and claims the benefit under the Paris Convention of South Korean Application KR 10-2015-0040593 titled "METHOD FOR ENCRYPTING A DATABASE," filed Mar. 24, 2015, which is incorporated herein by reference in its entirety.

FIELD

The present invention relates to database encryption, and more particularly, to encrypting and storing data to prevent an internal administrator having authority from modifying the data.

BACKGROUND

With the development of computer and Internet technology, the importance of databases for efficiently storing a large quantity of data and easily and rapidly retrieving the stored data by using a desired search condition has increased. Current database systems permit numerous information to be stored and searched. Some of the information may include sensitive information such as credit card numbers, and the like.

In particular, the security of a database that collects and manages personal information in the financial sector, Internet portal sites, and the like is obligatorily required to protect an information processing service of a user having proper authority so as not to be rejected by a computer system and guarantee integrity, confidentiality, and availability of data in a database management system storing mass data, in order to prevent a user having no authority from obtaining or improperly writing information processed by a computer.

In recent years, information leakage by exposure of an encryption key by a server administrator or a developer of a database has been a serious problem. That is, with a gradual increase of the degree of information integration, the quantity of information accumulated in a database that exists in an enterprise has increased in proportion thereto, and as a result, when client information (residential registration numbers, phone numbers, account numbers, and the like) contained in a client information database managed by a communication company leaks through an illegal route, the ripple effect from the damage has become huge.

The leakage of the data may occur due to hacking by a hacker outside the enterprise, physical access to a data storage space, and the like, but most information leakage substantially occurs due to an internal person (for example, a database administrator) having a valid access authority to the database and information leakage due to an internal person may cause more serious and critical damage than a hacking accident which occurs from outside.

The prior art that administrates database security restricts access to specific information by a specific user by using an access control scheme prescribed in a security profile allocated to respective clients. The technology may prevent a client from accessing unlicensed information. However, the prior art has a disadvantage in that an illegal action of an internal person (for example, database administrator) having proper access authority or a person having OS privilege cannot be prevented.

SUMMARY

In order to solve the problem, a scheme that encrypts confidential information in a user application is proposed, but in the case of the scheme, since all user applications handling the confidential information need to be encrypted/decrypted, there may be inconvenience that encryption/decryption codes in all of the user applications need to be provided.

Therefore, in order to protect the confidential information in the database system in an efficient scheme and prevent illegal actions of an internal person without changing the user application, a demand for a technique that encrypts and stores data exists in the art.

The present invention is contrived against the aforementioned background art and has been made in an effort to encrypt and store data to protect data from access by an internal administrator having authority, a person having OS privilege, or a person who can physically access a database server.

The present invention has also been made in an effort to verify integrity of data encrypted by using a hash function.

The present invention has also been made in an effort to verify the integrity of data when an attempt to overwrite one encrypted datum with encrypted data that has the same format and exist at a different position, is made.

The present invention has been made in an effort to verify the integrity of the data when the encrypted data is updated, and an attempt to overwrite the updated data with an encryption value before updating is made.

According to an embodiment of the present invention to solve the aforementioned problem, a computer program stored in a computer-readable medium for encrypting a data value included in a data table stored in a memory and storing the encrypted data value in a persistent storage medium is disclosed. The computer program allows a computer to perform steps including: generating an encrypted data value based on the data value included in the data table stored in a memory; generating a hash value that matches the encrypted data value at least partially based on the data value and positional information of the data value; and determining to write the encrypted data value and the hash value on a persistent storage medium.

According to another embodiment of the present invention, a computer program stored in a computer-readable medium for encrypting a data value included in a data table stored in a memory and storing the encrypted data value in a persistent storage medium is disclosed. The computer program allows a computer to perform steps including: generating an encrypted data value based on the data value included in the data table stored in a memory; generating a hash value that matches the encrypted data value at least partially based on the data value and storage positional information on a persistent storage medium in which the data value is to be stored; and determining to write the encrypted data value and the hash value on the persistent storage medium.

Further, according to an embodiment of the present invention, a computer program stored in a computer-readable medium is disclosed. The computer program allows a computer to perform steps including: generating, when an encrypted data value is updated, a second encrypted data value based on the updated data value; determining to store the second encrypted data value at a second position different from the position of the encrypted data value; generating a hash value that matches the second encrypted data value at least partially based on the updated data value and positional information of the second position; and determining to write the second encrypted data value and the hash value on the persistent storage medium.

Further, according to another embodiment of the present invention, a computer program stored in a computer-readable medium is disclosed. The computer program allows a computer to perform steps including: generating, when an encrypted data value is updated, a second encrypted data value based on the updated data value; determining to store the second encrypted data value at a second position different from the position of the encrypted data value on a persistent storage medium; generating a hash value that matches the second encrypted data value at least partially based on the updated data value and positional information of the second position; and determining to write the second encrypted data value and the hash value on the persistent storage medium.

According to an embodiment of the present invention, a computer program stored in a computer-readable medium for verifying integrity for encrypted data stored in a persistent storage medium is disclosed. The computer program allows a computer to perform steps including: generating a decrypted data value based on the encrypted data value stored on the persistent storage medium; generating a hash value that matches the decrypted data value at least partially based on the decrypted data value and positional information of the decrypted data value in a data table; and verifying integrity of the decrypted data by comparing the generated hash value and the hash value stored on the persistent storage medium.

According to another embodiment of the present invention, a computer program stored in a computer-readable medium for verifying integrity for encrypted data stored in a persistent storage medium is disclosed. The computer program allows a computer to perform steps including: generating a decrypted data value based on the encrypted data value stored on the persistent storage medium; generating a hash value that matches the decrypted data value at least partially based on the decrypted data value and storage positional information of the encrypted data value on the persistent storage medium; and verifying integrity of the decrypted data by comparing the generated hash value and the hash value stored on the persistent storage medium.

According to an embodiment of the present invention, a database server that encrypts and stores a data value to protect the data from access by an internal administrator having authority is disclosed. The database server may include: a memory storing a data table including a data value; an encryption module generating an encrypted data value based on the data value; a hash module generating a hash value that matches the encrypted data value at least partially based on the data value and positional information of the data value; and a persistent storage medium in which the encrypted data value and the hash value are written.

According to another embodiment of the present invention, a database server that encrypts and stores a data value to protect the data from an access by an internal administrator having authority is disclosed. The database server may include: a memory storing a data table including a data value; an encryption module generating an encrypted data value based on the data value; a hash module generating a hash value that matches the encrypted data value at least partially based on the data value and storage positional information on a persistent storage medium in which the data value is to be stored; and the persistent storage medium in which the encrypted data value and the hash value are written.

According to an embodiment of the present invention, a database server that can protect data against an attack by an internal administrator having authority for an encrypted and stored data value is disclosed. The database server may include: an encryption module generating, when an encrypted data value is updated, a second encrypted data value based on the updated data value; a storage module determining to store the second encrypted data value at a second position different from the position of the encrypted data value; a hash module generating a hash value that matches the second encrypted data value at least partially based on the updated data value and positional information of the second position; and the persistent storage medium in which the second encrypted data value and the hash value are written.

According to another embodiment of the present invention, a database server that can protect data against an attack by an internal administrator having authority for an encrypted and stored data value is disclosed. The database server may include: an encryption module generating, when an encrypted data value is updated, a second encrypted data value based on the updated data value; a storage module determining to store the second encrypted data value at a second position different from the position of the encrypted data value on a persistent storage medium; a hash module generating a hash value that matches the second encrypted data value at least partially based on the updated data value and positional information of the second position; and the persistent storage medium in which the second encrypted data value and the hash value are written.

According to an embodiment of the present invention, a database server for verifying integrity of an encrypted data value stored on a persistent storage medium is disclosed. The database server may include: a persistent storage medium in which the encrypted data value and a first hash value are stored; a decryption module generating a decrypted data value based on the encrypted data value stored on the persistent storage medium; a hash module generating a second hash value that matches the decrypted data value at least partially based on the decrypted data value and positional information of the decrypted data value in a data table; and an integrity verification module verifying integrity of the decrypted data value by comparing the first and second hash values.

According to another embodiment of the present invention, a database server for verifying integrity of an encrypted data value stored on a persistent storage medium is disclosed. The database server may include: a persistent storage medium in which the encrypted data value and a first hash value are stored; a decryption module generating a decrypted data value based on the encrypted data value stored on the persistent storage medium; a hash module generating a second hash value that matches the decrypted data value at least partially based on the decrypted data value and storage positional information of the encrypted data value on the persistent storage medium; and an integrity verification module verifying integrity of the decrypted data value by comparing the first and second hash values.

ADVANTAGES

According to the present invention, data is encrypted and stored to protect data from access by an internal administrator having authority, a person having OS privilege, or a person who can physically access a database server.

Integrity of data encrypted by using a hash function can be verified.

The integrity of the data can be verified when there is an attempt to overwrite one encrypted datum with encrypted data that exists at a different position, which has the same format.

The integrity of the data can be verified when in the case where the encrypted data is updated, an attempt to overwrite the updated data with an encryption value before updating is made.

Various embodiments will now be described with reference to the drawings. However, similar reference numerals are used to represent similar elements throughout the drawings. For description, in the specification, various descriptions are presented to provide appreciation of the present invention. However, it is apparent that the embodiments can be executed without the specific description. In other examples, known structures and devices are presented in a block diagram form in order to facilitate description of the embodiments.

DETAILED DISCUSSION

Various embodiments will now be described with reference to the drawings and similar reference numerals are used to represent similar elements throughout the drawings. In the specification, various descriptions are presented to provide appreciation of the present invention. However, it is apparent that the embodiments can be executed without the detailed description. In other examples, known structures and devices are presented in a block diagram form in order to facilitate description of the embodiments.

"Component", "module", "system", and the like which are terms used in the specification designate a computer-related entity, hardware, firmware, software, and a combination of software and hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or execution thread and one component may be localized in one computer or distributed among two or more computers. Further, the components may be executed by various computer-readable media having various data structures, which are stored therein. The components may, for example, perform communication through local and/or remote processing according to a signal (for example, data through a network such as the Internet with another system through data and/or a signal from one component that interacts with another component in a local system and a distribution system) having one or more data packets.

The description of the presented embodiments is provided so that those skilled in the art of the present invention can use or implement the present invention. It will be apparent to those skilled in the art that various modifications of the embodiments can be made and general principles defined herein can be applied to other embodiments without departing from the scope of the present invention. Therefore, the present invention is not limited to the embodiments presented herein, but should be analyzed within the widest range which is associated with the principles and new features presented herein.

"Data table" and "table" which are terms used in the specification may be often used to be exchanged with each other.

Figure 1:
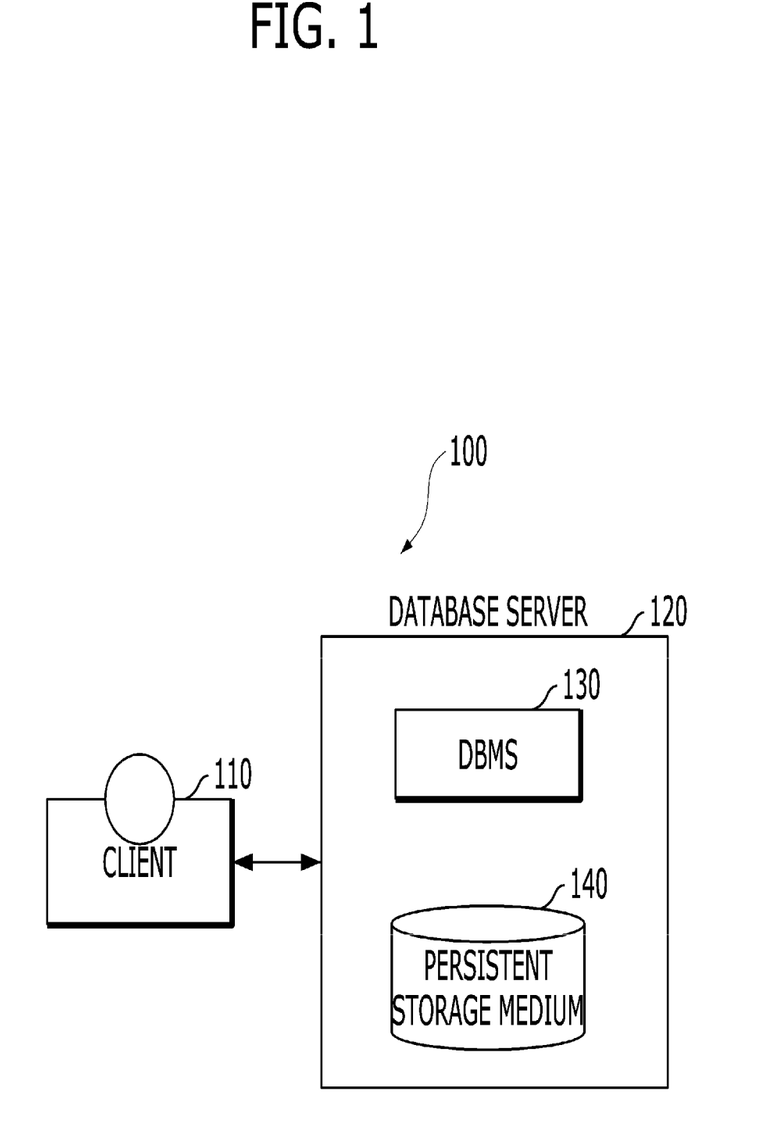
FIG. 1 exemplarily illustrates a database system 100 according to an embodiment of the present invention.

FIG. 1 illustrates a database system 100 according to an embodiment of the present invention.

As illustrated in FIG. 1, a database server 120 may include any type of computer system or computer device such as a microprocessor, a mainframe computer, a digital single processor, a portable device, and a device controller.

A client device 110 may mean nodes in the database system having a mechanism for communicating through a network. For example, the client device 110 may include a PC, a laptop computer, a workstation, a terminal, and/or any electronic device having a network connection characteristic.

The database server 120 may include a database management system (DBMS) 130 and a persistent storage medium 140. Although not illustrated in FIG. 1, the database server 120 may include one or more memories including a buffer cache. Further, although not illustrated in FIG. 1, the database server 120 may include one or more processors. Accordingly, the DBMS 130 may operate by the processor on the memory.

The persistent storage medium 140 means a non-volatile storage medium which may continuously store predetermined data, such as a storage device based on a flash memory and/or a battery-backup memory in addition to a magnetic disk, an optical disk, and a magneto-optical storage device. The persistent storage medium 140 may communicate with the processor and the memory of the database server 120 through various communication means. In an additional embodiment, the persistent storage medium 140 is positioned outside the database server 120 to communicate with the database server 120.

The DBMS 130, as a program for permitting performing operations such as retrieving, inserting, correcting, and/or deleting data required for the database server 120, may be implemented by a processor in the memory of the database server 120, as described above.

The client device 110 may communicate with the database server 120 through the network. The network according to the embodiment of the present invention may use various wired communication systems such as a public switched telephone network (PSTN), an x digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

Further, the network proposed in this specification may use various wireless communication systems such as a code division multi access (CDMA), a time division multi access (TDMA), a frequency division multi access (FDMA), an orthogonal frequency division multi access (OFDMA), a single carrier-FDMA (SC-FDMA), and other systems. The techniques described in this specification may be used even in other networks as well as the above-mentioned networks.

Figure 2:
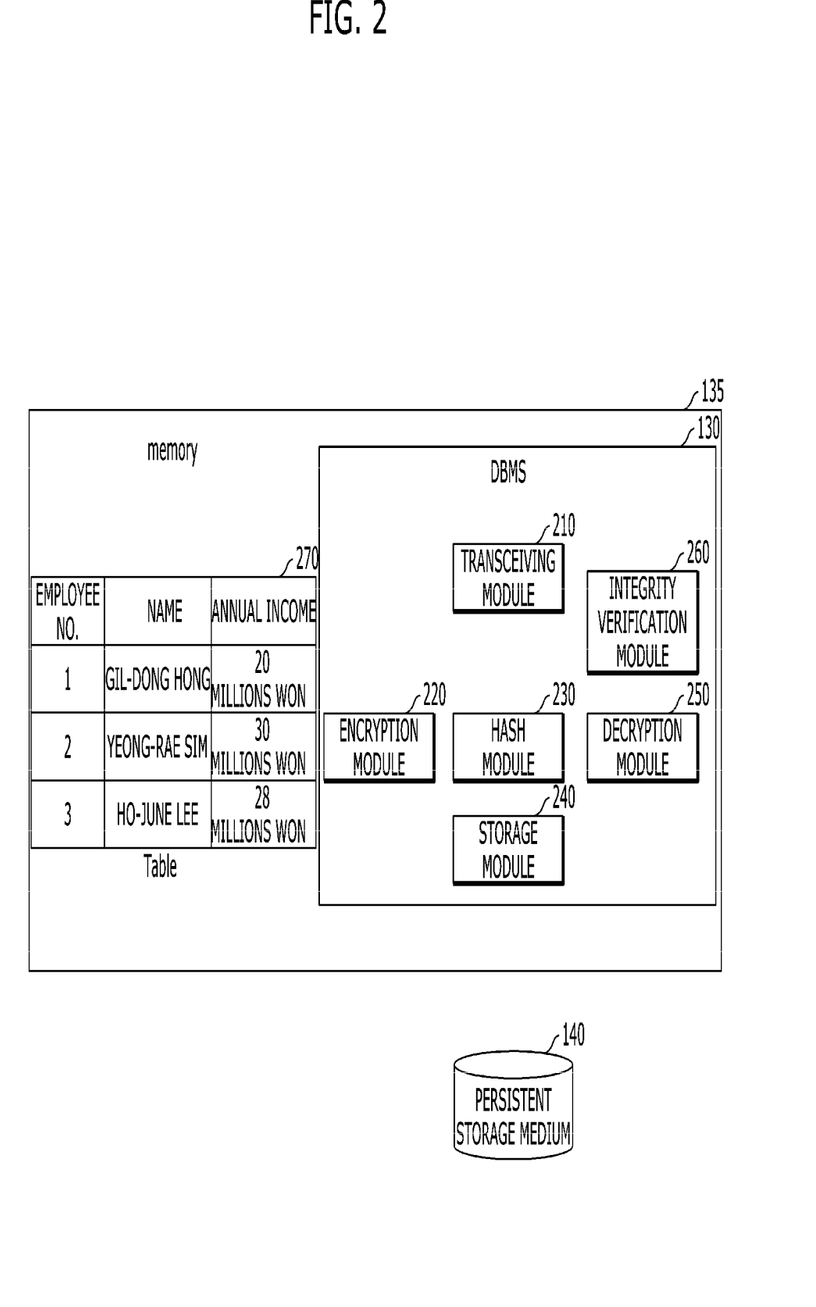
FIG. 2 is a block diagram of a database server according to an embodiment of the present invention.

FIG. 2 is a block diagram of the database server according to an embodiment of the present invention.

The database server 120 according to the embodiment of the present invention may include a persistent storage medium 140, a DBMS 130, and a memory 135. As described above, the DBMS 130 may be operated by one or more memories 135 and one or more processors in the database server 120.

The DBMS 130 may include a transceiving module 210, an encryption module 220, a hash module 230, a storage module 240, a decryption module 250, and an integrity verification module 260. The respective modules in the DBMS 130 illustrated in FIG. 2 may communicate with each other. The modules of the DBMS 130 are exemplified, and additional modules may be included depending on the implementation, or some of the modules may also be omitted.

The memory 135 may mean a volatile storage device in which stored information is momentarily removed when power is turned off, as a main storage device of which the processor directly accesses, such as a random access memory (RAM) such as a dynamic random access memory (DRAM) and a static random access memory (SRAM). The memory 135 may be operated by the processor. The memory 135 may temporarily store a data table 270 including a data value. The data table 270 may include data values, and in the embodiment of the present invention, the data values of the data table 270 are encrypted by a column unit to be stored in the persistent storage medium 140. The memory 135 includes a buffer cache, and data may be stored in a data block of the buffer cache. The data may be recorded in the persistent storage medium 140 by a background processor.

The transceiving module 210 may receive data storage, inquiry, and data encryption requests, and the like from a user. Further, the transceiving module 210 may also transmit result information for the data storage and the inquiry request.

The encryption module 220 may perform encryption for the data before recording (storing) the data in the persistent storage medium 140. The encryption module 220 may generate a cipher text or encrypted text based on a plain text. The encryption method for the data in this specification may include column-level encryption and tablespace-level encryption. The column-level encryption means encrypting the data of the column designated to be encrypted. The tablespace-level encryption means that the encryption for the data is implemented by a tablespace unit, and for example, physical data files generated on an OS system are encrypted. In an aspect of the present invention, the column-level encryption may be performed with respect to the data to be stored.

The encryption module 220 may generate data values encrypted based on the data values. The encryption module 220 may determine an encryption function based on the encryption information included in an encryption key and generate the data values encrypted by using the encryption function calculated based on the data value.

The encryption key may include information relating to at least an encryption mode, an encrypted data type, data length information, and the like. The encryption mode may include at least one of a data encryption standard (DES), a triple DES, an advanced encryption standard (AES), an ARIA, and a SEED. The encryption key may be used in encryption and decryption. The encryption function may include an encryption algorithm which may change the plain text into the encrypted text. The encryption function may refer to the encryption key when the encryption and the decryption are performed. The encryption key may be stored inside the database server 120 or stored outside the database server 120, and additionally, for security, the encryption key may be encrypted and stored through a master key. The master key may be stored in an external storage medium or the database server 120. An encryption (decryption) technique according to an aspect of the present invention may be configured in a combination of a variety of encryption algorithms, encryption keys, and/or encryption options (whether an initialization vector is used, and the like).

Further, the encryption module 220 may generate a second encrypted data value based on the updated data value when the encrypted data value is updated. The second encrypted data value may be different from the existing encrypted data value.

The aforementioned encryption operation may be performed with respect to one or more columns determined to encrypt one or more column data values of the data table 270. Accordingly, since the aforementioned encryption operation is performed only with respect to not all data values of the data table 270 but the data value (for example, a credit card number, an annual salary, etc.) of the column requiring the encryption, the database may be more efficiently encrypted.

The hash module 230 may generate a hash value for verifying integrity of the decrypted text. The hash module 230 may generate a hash value by using a hash algorithm such as secure hash algorithm (SHA) series and an MD5. The aforementioned hash algorithm is just an example, and the hash module 230 of the present invention may generate a hash value by using any hash algorithm.

The hash module 230 may generate the hash value matched with the encrypted data value at least partially based on the data value of the data table 270 and position information of the data value. The position information of the data value may include at least one of a row identifier (row ID) and a column key. The column key is at least partially based on meta information of the data table, and the row ID may be at least partially based on a position where the data value is to be recorded on the data block.

In more detail, the hash module 230 may acquire the column key at least partially based on the meta information of the data table. Further, the encrypted data may be recorded in the data block of the memory 135. In this case, the row ID may be generated. The row ID may be unique with respect to the data block. Further, the hash module 230 may acquire the row ID at least partially based on the position where the data value is to be recorded on the data block. Further, the hash module 230 may generate a hash value matched with the encrypted data value at least partially based on the data value, the column key, and the row ID.

Further, the hash module 230 may generate the hash value matched with the encrypted data value at least partially based on the data value and storage position information on the persistent storage medium 140 where the data value is to be stored. The storage position information on the persistent storage medium 140 may include at least one of the row ID and the column key.

Further, the hash module 230 may generate a hash value matched with the second encrypted data value, at least partially based on the updated data value and position information of a second position which is different from the position of the encrypted data value where the second encrypted data value generated based on the updated data value is stored, when the encrypted data value is updated.

Further, the hash module 230 may generate a hash value matched with the second encrypted data value, at least partially based on the updated data value and position information of a second position which is different from the position on the persistent storage medium 140 of the encrypted data value on the persistent storage medium 140 where the second encrypted data value generated based on the updated data value is stored, when the encrypted data value is updated.

Further, the hash module 230 may generate a hash value matched with the decrypted data value at least partially based on the decrypted data value and position information in the data table 270 of the decrypted data value when the encrypted data is decrypted.

Further, the hash module 230 may generate a hash value matched with the decrypted data value, at least partially based on a decrypted data value and storage position information in the persistent storage medium 140 of the decrypted data value when the encrypted data is decrypted.

The hash module 230 may generate a hash value matched with the data values, at least partially based on a data value (plain text), an updated data value (plain text), or a decrypted data value (decrypted text) and storage position information on the data table 270 of the data values. Further, the hash module 230 may generate a hash value matched with the data values, at least partially based on a data value (plain text), an updated data value (plain value), or a decrypted data value (decrypted text) and a storage position on the persistent storage medium 140 of the data values.

When the hash value is not used, an internal person holding valid access authority, a person holding OS authority, or a person who can physically access the database server 120 obtains the encrypted data value to store the encrypted data value in a different position from an original position on the persistent storage medium 140. In this case, since the decrypted text of the encrypted data value outputs the valid data value, the integrity verification module 260 may not sense modulation of the data. When the data is modulated by matching the hash value with the encrypted data value, the stored hash value and the hash value based on the decrypted data value are different from each other and the integrity verification module 260 may sense the modulation of the data. However, in the case where the hash value is simply based on the plain text of the data, when the internal person holding valid access authority, the person holding OS authority, or the person who can physically access the database server 120 obtains the encrypted data value and the hash value matched with encrypted data value to perform an attack of storing the values at a different storage position, since the decrypted data value is valid, and the hash value based on the decrypted data value is the same as the stored hash value, the modulation of the data or not may not be sensed. However, the hash value according to the embodiment of the present invention may be at least partially based on the plain text of the data value and the storage position of the encrypted data. Accordingly, with respect to an attack of changing the storage position of the data described above, since the hash value based on the decrypted data value and the storage position of the decrypted data value is different from the stored hash value, the integrity verification module 260 may sense the position change of the valid encrypted data value.

The storage module 240 may determine the encrypted data value or the storage position of the hash value. The storage module 240 may determine the storage position on the data table 270 of the encrypted data value. Further, the storage module 240 may determine the storage position on the persistent storage medium 140 of the encrypted data value. Further, the storage module 240 may determine to store the data value, the encrypted data value, and the hash value. Further, the storage module 240 may determine the storage positions on the data block in the memory 135 of the encrypted data value and the hash value. When the storage position on the data block is determined, the row ID may be determined.

In the embodiment of the present invention, an operation of recording the data (for example, the encrypted data) in the persistent storage medium 140 may be implemented by a background process (for example, a database buffer writer, a data block writer, a checkpoint process, and/or a log writer) of the DBMS 130. In this case, when the encryption module 220 stores the encrypted data in the memory (for example, a buffer cache) (foreground process), the background process may record the encrypted data in the persistent storage medium 140 at a predetermined time. In this specification, for convenience of the description, it is described that the storage module 240 includes the operation of determining to store the data and the operation of the background process.

The storage module 240 may determine to store the second encrypted data value generated based on the updated data value in the second position different from the position of the encrypted data value, when the encrypted data value is updated. Therefore, the row ID of the second encrypted data value may be changed.

Further, the storage module 240 may determine to store the second encrypted data value generated based on the updated data value in the second position different from the position on the persistent storage medium 140 of the encrypted data value on the persistent storage medium 140, when the encrypted data value is updated. Therefore, the row ID of the second encrypted data value may be changed.

When the data value is updated, the storage module 240 may store (alternatively, record) the data updated at the position different from the stored position before updating.

When the encrypted data value is updated, the storage module 240 stores the second encrypted data value generated based on the updated value in the position different from the storage position of the existing encrypted data value on the persistent storage medium 140, and as a result, the hash value matched with the second encrypted data value may be different from the existing hash value. Accordingly, even when the internal person holding valid access authority, the person holding OS authority, or the person who can physically access the database server 120 or the persistent storage medium 140 obtains both the encrypted data value before updating and the hash value and stores the values at the storage position of the updated data value, the integrity verification module 260 may sense the modulation of the data values. Therefore, additional security may be achieved according to the update of the encrypted data. In the existing database server, when the data value is updated, the storage position is not changed on the persistent storage medium. However, in the database server 120 according to the embodiment of the present invention, whenever the data value is updated, the storage position on the persistent storage medium 140 is changed and thus higher-level security is possible.

The storage module 240 may determine to store the encrypted data value and the hash value in the data block on the persistent storage medium 140. Further, the storage module 240 may record the data of the data block of the memory 135 in the persistent storage medium 140. Based on the encrypted data value and the hash value, a check sum may be generated in the block of the persistent storage medium 140. When the encrypted data value or the hash value is changed, the value of the check sum is changed, and as a result, the check sum may be used to sense the change of the encrypted data value or the hash value.

The decryption module 250 may generate a decrypted data value based on the encrypted data value. In this case, the decryption module 250 may use the same symmetry key as the encryption key used when the encryption text is generated in the encryption module 220. The decryption module 250 may generate a decrypted data value based on the encrypted data value stored on the persistent storage medium 140.

The integrity verification module 260 may verify the integrity of the decrypted data value by comparing a first hash value matched with the encrypted data value stored on the persistent storage medium 140 with a second hash value matched with the decrypted data value.

In the embodiment of the present invention, when the data value is encrypted and stored, the storage module 240 stores the data value by matching the first hash value based on the data value and the storage position of the data value with the encrypted data value. Further, in the embodiment of the present invention, when the encrypted data value is decrypted, the second hash value based on the decrypted data value and the storage position of the decrypted data value is matched with the decrypted data value obtained by decrypting the encrypted data value. When the first and second hash values are the same as each other, it is determined that the data value and the decrypted data value are the same as each other, and then the integrity of the decrypted data value may be determined. Since the aforementioned hash values are at least partially based on the storage position of the data value, the hash values may be used to verify the integrity of the data against the attack which changes the storage position of the encrypted data values by the internal person.

Figure 3:
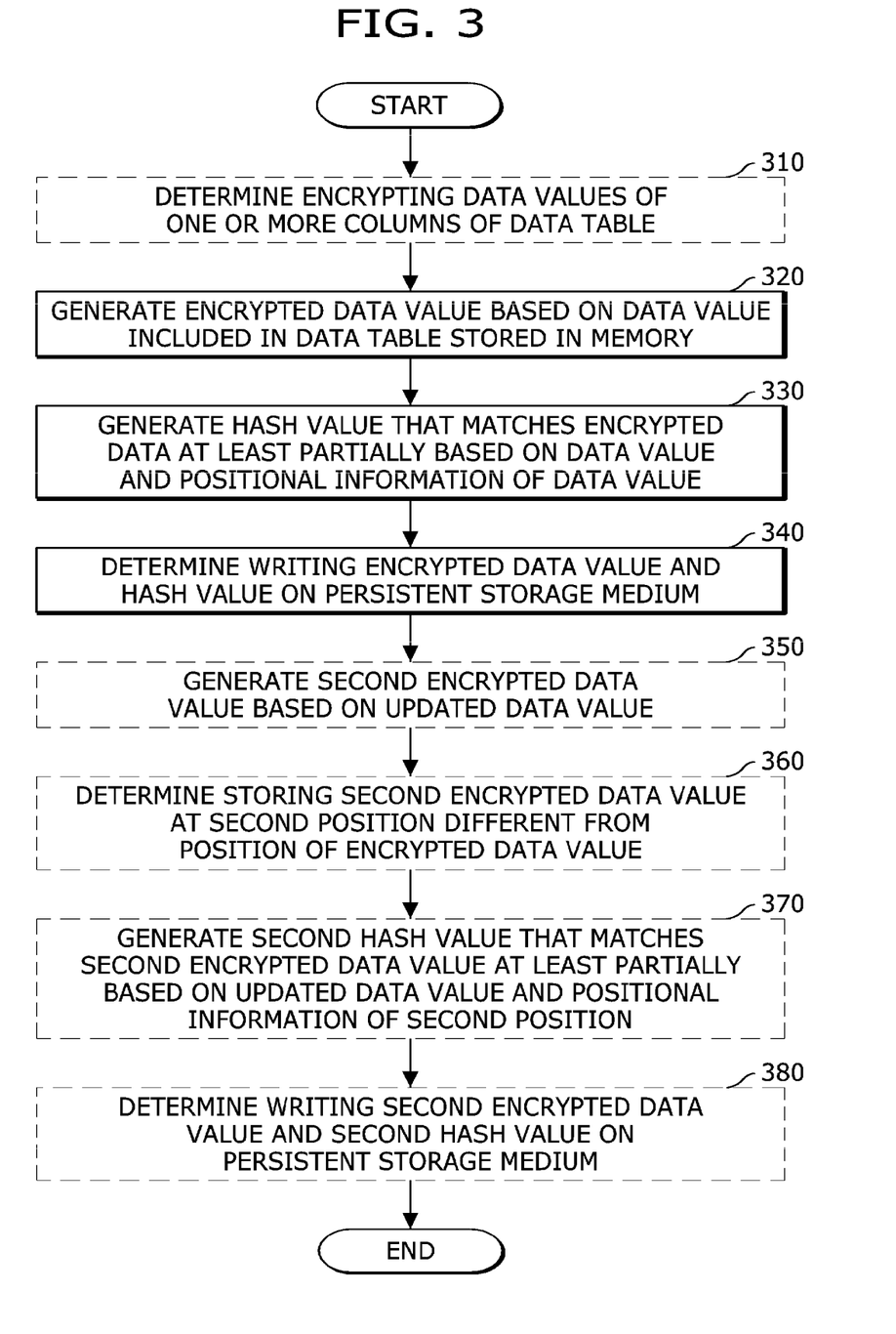
FIG. 3 is a flowchart of a method for encrypting a database according to an embodiment of the present invention.

FIG. 3 is a flowchart of a method for encrypting a database according to an embodiment of the present invention.

In the embodiment of the present invention, the method may be performed by, for example, respective modules of a data base server 120. Further, not every step of the flowchart illustrated in FIG. 3 is required and as necessary, some steps may be omitted or added.

The database server 120 may determine to encrypt data values of one or more columns of a data table 270 stored in a memory 135 (310). In one aspect of the present invention, column-level encryption may be performed with respect to data to be stored. Therefore, since the database server 120 does not encrypt the entirety of the data table 270, the data may be efficiently encrypted and stored by saving resources without being under performance restriction. In an example of the data table 270 illustrated in FIG. 2, the column level encryption may be performed only with respect to an "annual income" column including a data value corresponding to an annual income.

An encryption module 220 may generate an encrypted data value based on the data value included in the data table 270 stored in the memory 135 (320). The encrypted data value may be generated by a predetermined encryption algorithm as described above.

A hash module 230 may generate a hash value that matches the encrypted data value at least partially based on the data value and positional information of the data value (330). The positional information of the data value may include at least one of a row ID and a column key. The column key may be at least partially based on meta information of the data table 270. The column key may exist for each column of the data table 270 and vary for each column. The row ID may be at least partially based on a position at which the data value is to be written on a data block. The encrypted data value may be written in the data block of the memory 135. In this case, the row ID may be generated. The hash module 230 may acquire the row ID. The row ID may be unique to the data block. A physical storage position on a persistent storage medium 140 may be determined according to the position on the data block of the memory 135 and the row ID may be unique to the persistent storage medium 140. In more detail, the hash module 230 may acquire the column key at least partially based on the meta information of the data table. Further, the hash module 230 may acquire the row ID at least partially based on the position at which the data value is to be written on the data block. Further, the hash module 230 may generate a hash value that matches the encrypted data value at least partially based on the data value, the column key, and the row ID.

A storage module 240 may determine to write the encrypted data value and the hash value on the persistent storage medium 140 (340). In an additional aspect of the present invention, when the storage module 240 stores the encrypted data value and the hash value on the memory, a background process may write the data value and the hash value stored on the memory in the persistent storage device 140 every predetermined time. The storage module 240 may determine storage positions of the encrypted data value and the hash value on the persistent storage device 140.

Further, when the encrypted data value is updated, the encryption module 220 may generate a second encrypted data value based on the updated data value (350).

The storage module 240 may determine to store the second encrypted data value at a second position different from the position of the encrypted data value (360). Accordingly, the second encrypted data value may be stored at a position different from a storage position of the encrypted data value. Therefore, a row ID of the second encrypted data value may be changed.

The hash module 230 may generate a second hash value that matches the second encrypted data value at least partially based on the updated data value and positional information of the second position (370). Accordingly, since the row ID of the second encrypted data value is changed, the second hash value may be different from the first hash value.

The storage module 240 may determine to write the second encrypted data value and the second hash value on the persistent storage medium 140 (380).

Figure 4:
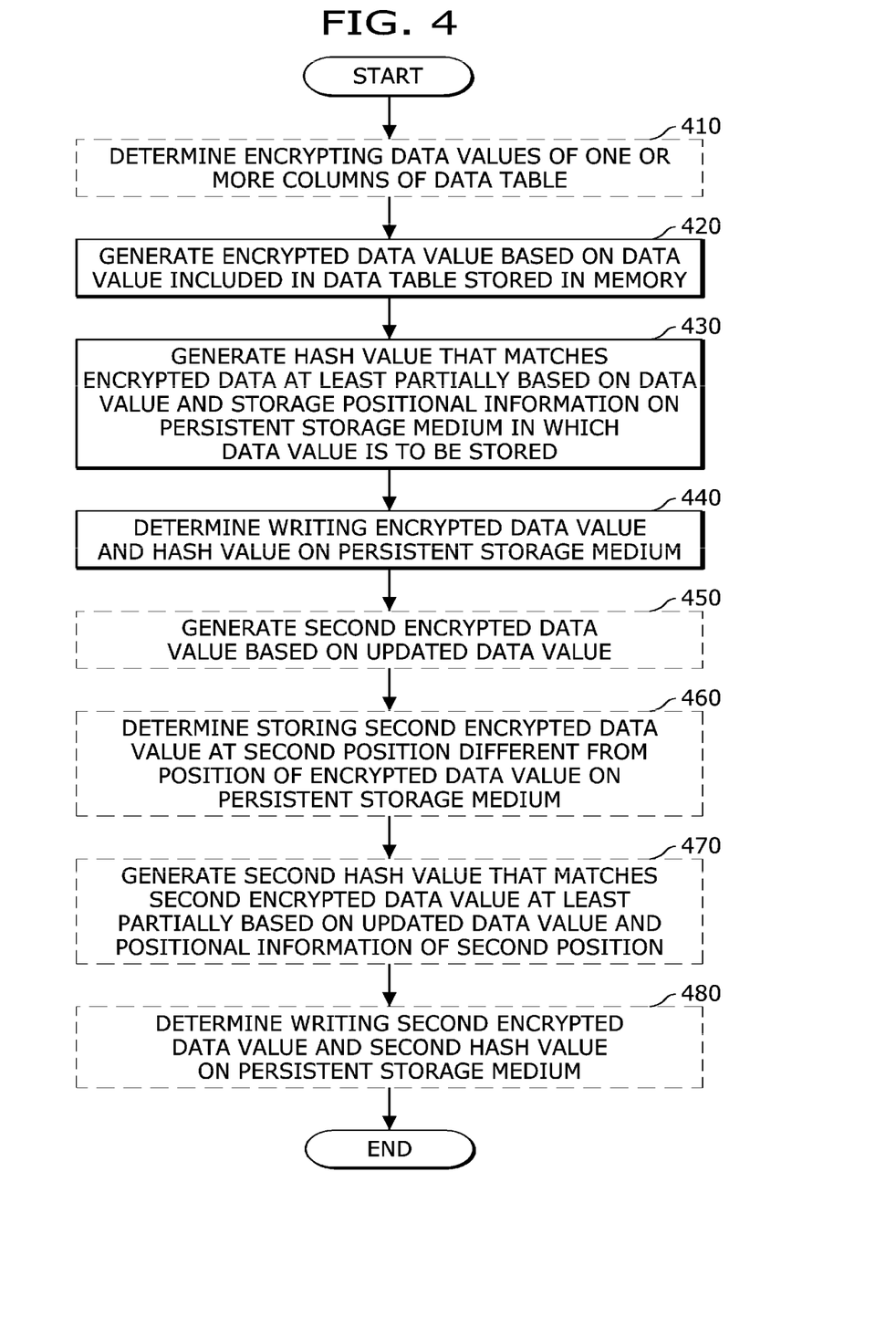
FIG. 4 is a flowchart of a method for encrypting a database according to another embodiment of the present invention.

FIG. 4 is a flowchart of a method for encrypting a database according to another embodiment of the present invention.

In the embodiment of the present invention, the method may be performed by, for example, the respective modules of the data base server 120. Further, not every step of the flowchart illustrated in FIG. 4 is required and as necessary, some steps may be omitted or added.

Since steps 410 and 420 and 450 illustrated in FIG. 4 are the same as steps 310 and 320, and 350 illustrated in FIG. 3, a description thereof follows the above description.

The hash module 230 may generate the hash value that matches the encrypted data value at least partially based on the data value and storage positional information on the persistent storage medium 140 in which the data value is to be stored (430). The storage positional information on the persistent storage medium 140 may include at least one of the row ID and the column key.

The storage module 240 may determine to write the encrypted data value and the hash value on the persistent storage medium 140 (440). The storage module 240 may determine the storage positions of the encrypted data value and the hash value on the persistent storage device 140.

The storage module 240 may determine to store the second encrypted data value acquired by encrypting the updated data value at a second position different from the position of the encrypted data value on the persistent storage medium 140 (460). Therefore, the row ID of the second encrypted data value may be changed.

The hash module 230 may generate the second hash value that matches the second encrypted data value at least partially based on the updated data value and the positional information of the second position (470). Accordingly, since the row ID of the second encrypted data value is changed, the second hash value may be different from the first hash value.

The storage module 240 may determine to write the second encrypted data value and the second hash value on the persistent storage medium 140 (480).

Figure 5:
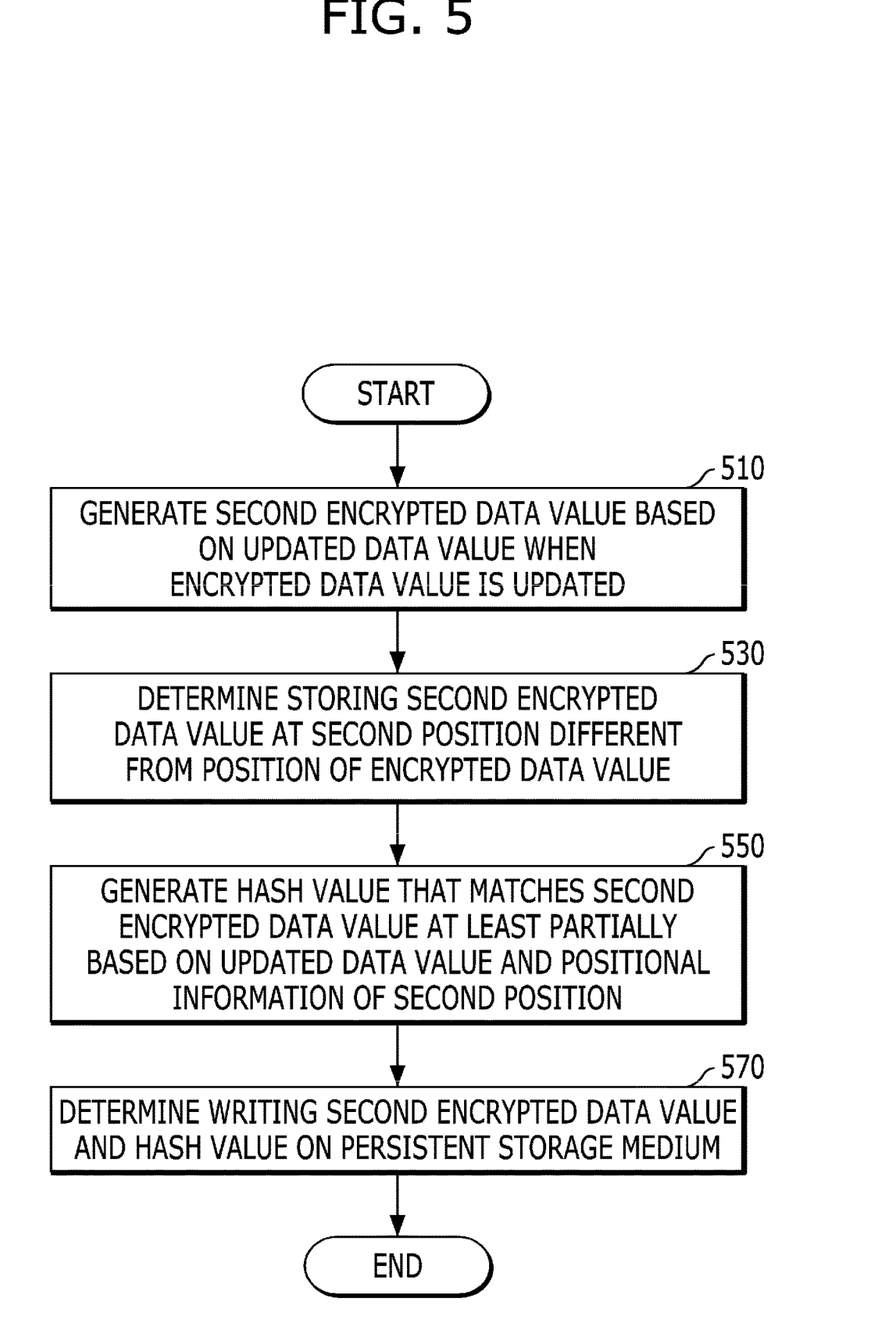
FIG. 5 is a flowchart illustrating an operation of a database server when an encrypted data value is updated according to the embodiment of the present invention.

FIG. 5 is a flowchart illustrating an operation of a database server when an encrypted data value is updated according to the embodiment of the present invention.

In the embodiment of the present invention, the method may be performed by, for example, the respective modules of the data base server 120. Further, not every step of the flowchart illustrated in FIG. 5 is required and as necessary, some steps may be omitted or added.

When the encrypted data value is updated, the encryption module 220 may generate the second encrypted data value based on the updated data value (510).

The storage module 240 may determine to store the second encrypted data value at the second position different from the position of the encrypted data value (530). Accordingly, the second encrypted data value may be stored at the position different from the storage position of the encrypted data value. Therefore, the row ID of the second encrypted data value may be changed.

The hash module 230 may generate the hash value that matches the second encrypted data value at least partially based on the updated data value and the positional information of the second position (550). Accordingly, since the row ID of the second encrypted data value is changed, the second hash value may be different from the first hash value.

The storage module 240 may write the second encrypted data value and the hash value (570).

Figure 6:
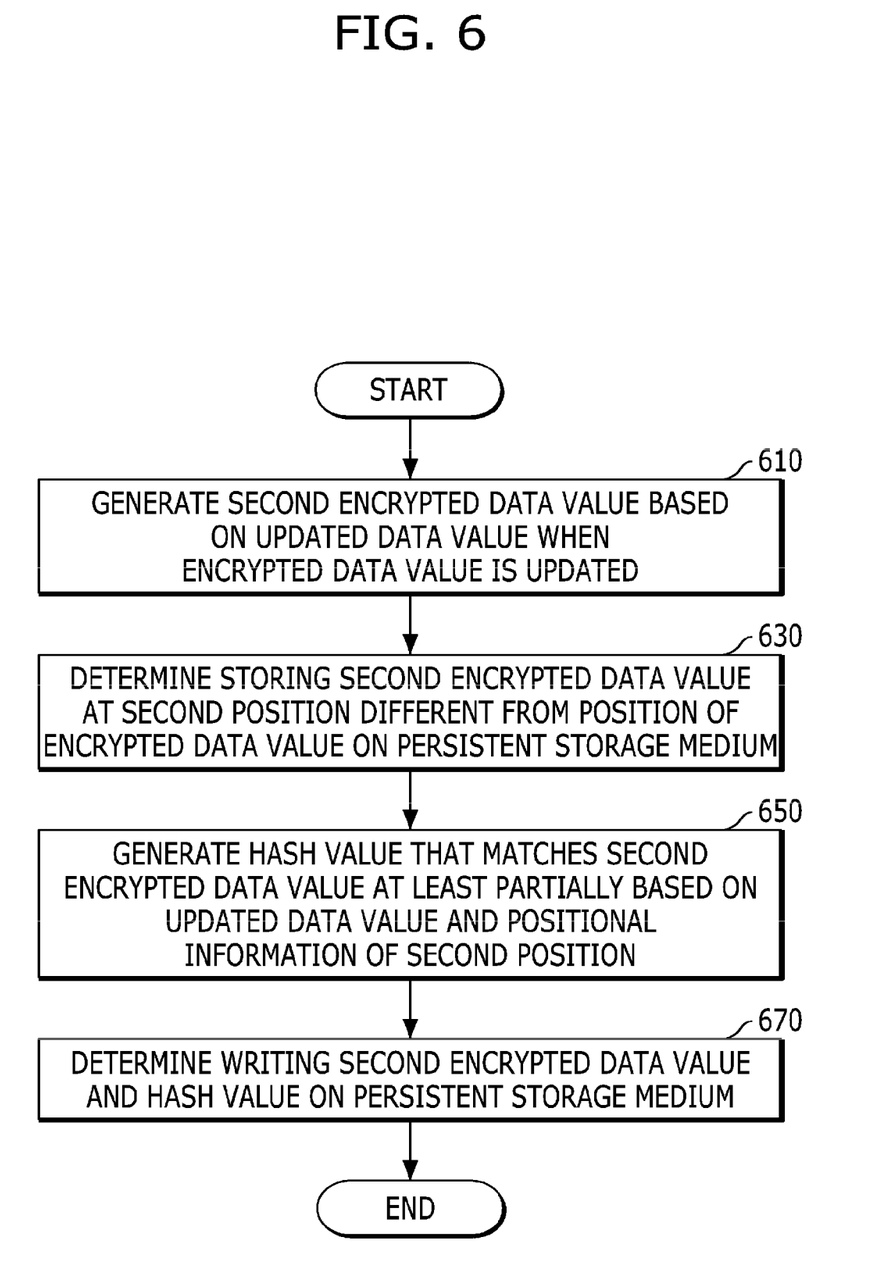
FIG. 6 is a flowchart illustrating an operation of a database server when an encrypted data value is updated according to another embodiment of the present invention.

FIG. 6 is a flowchart illustrating an operation of a database server when an encrypted data value is updated according to another embodiment of the present invention.

In the embodiment of the present invention, the method may be performed by, for example, the respective modules of the data base server 120. Further, not every step of the flowchart illustrated in FIG. 6 is required and as necessary, some steps may be omitted or added.

Since step 610 of FIG. 6 is the same as step 510 illustrated in FIG. 5, a description thereof follows the above description.

The storage module 240 may determine to store the second encrypted data value acquired by encrypting the updated data value at the second position different from the positions of the encrypted data value on the persistent storage medium 140 (630). Therefore, the row ID of the second encrypted data value may be changed.

The hash module 230 may generate the second hash value that matches the second encrypted data value at least partially based on the updated data value and the positional information of the second position (650). Accordingly, since the row ID of the second encrypted data value is changed, the second hash value may be different from the first hash value.

The storage module 240 may determine to write the second encrypted data value and the second hash value on the persistent storage medium 140 (670).

Figure 7:
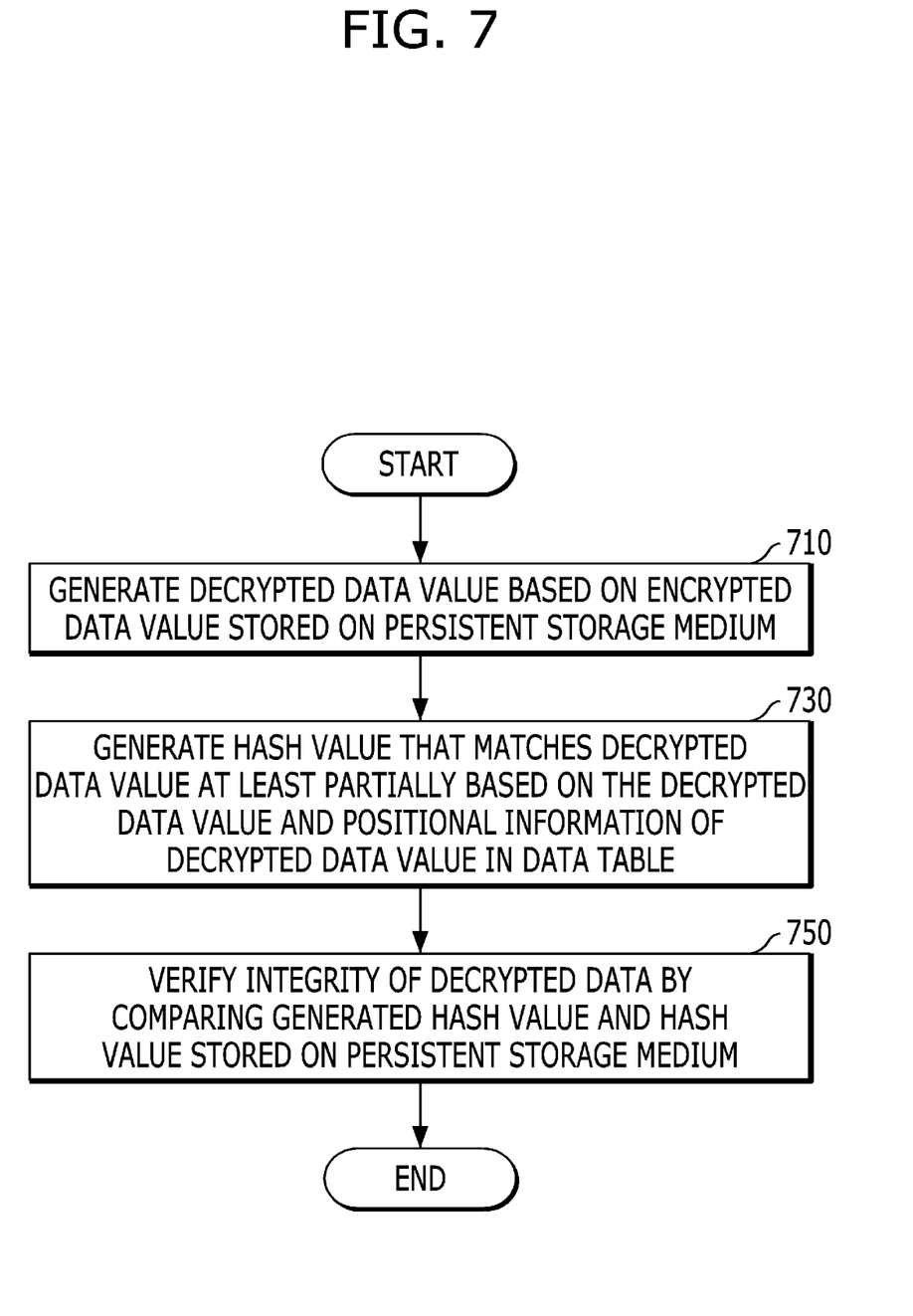
FIG. 7 is a flowchart of a method for decrypting a database according to an embodiment of the present invention.

FIG. 7 is a flowchart of a method for decrypting a database according to an embodiment of the present invention.

In the embodiment of the present invention, the method may be performed by, for example, the respective modules of the database server 120. Further, not every step of the flowchart illustrated in FIG. 7 is required and as necessary, some steps may be omitted or added.

The decryption module 250 may generate a decrypted data value based on the encrypted data value stored in the persistent storage medium 140 (710).

The hash module 230 may generate a hash value that matches the decrypted data value at least partially based on the decrypted data value and positional information of the decrypted data value in the data table 270 (730).

An integrity verification module 260 compares the generated hash value and a hash value stored in the persistent storage medium 140 to verify integrity of the decrypted data (750). The hash value stored in the persistent storage medium 140 may be a hash value generated at least partially based on a plain text before the decrypted data value is encrypted and positional information of the plain text in the data table 270. When the decrypted data value is the same as a plain text of the encrypted data and the position of the decrypted data value in the data table 270 and the position of the plain text in the data table 270 are the same as each other, the stored hash value may be the same as the hash value generated at least partially based on the decrypted data value and the positional information of the decrypted data value in the data table 270. In this case, the integrity verification module 260 may determine the integrity of the data.

Figure 8:
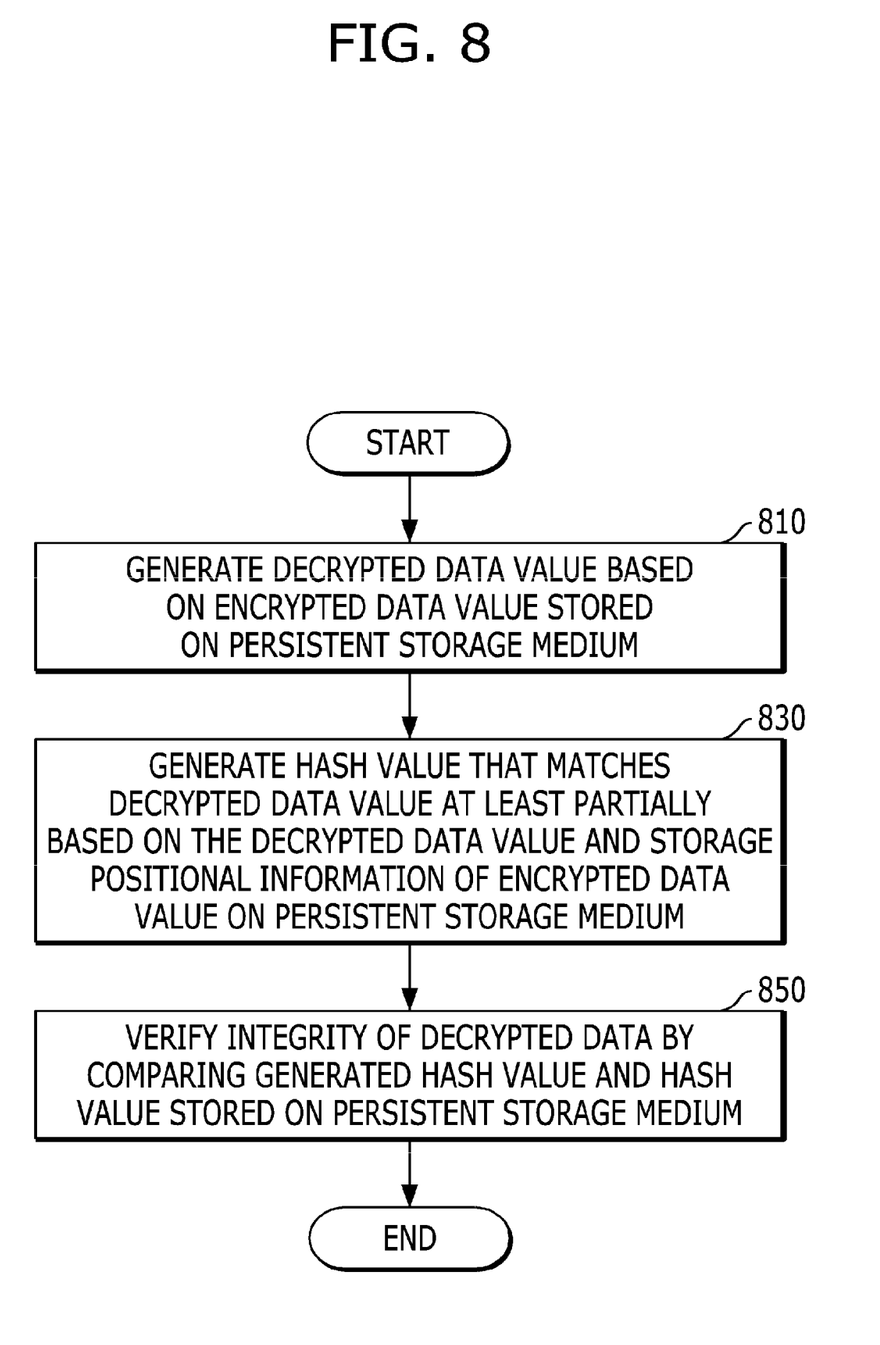
FIG. 8 is a flowchart of a method for decrypting a database according to another embodiment of the present invention.

FIG. 8 is a flowchart of a method for decrypting a database according to an embodiment of the present invention.

In the embodiment of the present invention, the method may be performed by, for example, the respective modules of the data base server 120. Further, not every step of the flowchart illustrated in FIG. 8 is required and as necessary, some steps may be omitted or added.

Since step 810 of FIG. 8 is the same as step 710 illustrated in FIG. 7, a description thereof follows the above description.

The hash module 230 may generate the hash value that matches the decrypted data value at least partially based on the decrypted data value and the storage positional information of the decrypted data value on the persistent storage medium 140 (830).

The integrity verification module 260 compares the generated hash value and the hash value stored in the persistent storage medium 140 to verify the integrity of the decrypted data (850). The hash value stored on the persistent storage medium 140 may be the hash value generated at least partially based on the plain text before the decrypted data value is encrypted and the positional information of the plain text on the persistent storage medium 140. When the decrypted data value is the same as the plain text of the encrypted data value and the position of the decrypted data value on the persistent storage medium 140 which is stored before the decryption and the position of the plain text in the persistent storage medium 140 in which the encrypted data value is to be stored are the same as each other, the stored hash value may be the same as the hash value generated at least partially based on the decrypted data value and the positional information of the decrypted data value in the persistent storage medium 140 in which the encrypted data value is to be stored. In this case, the integrity verification module 260 may determine the integrity of the data.

Those skilled in the art of the present invention will appreciate that various exemplary logic blocks, modules, processors, means, circuits, and algorithm steps can be implemented by electronic hardware, various types of programs or design codes (designated as "software" herein for easy description), or a combination thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present invention may implement functions described by various methods with respect to each specific application, but it should not be analyzed that the implementation determination departs from the scope of the present invention.

Various embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like, but is not limited thereto. Further, various storage media presented herein include one or more devices and/or other machine-readable media. The term "machine-readable media" include a wireless channel and various other media that can store, posses, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present invention may be rearranged based on design priorities. Appended method claims provide elements of various steps in a sample order, but it does not mean that the method claims are limited to the presented specific order or hierarchical structure.

The description of the presented embodiments is provided so that those skilled in the art of the present invention can use or implement the present invention. It will be apparent to those skilled in the art that various modifications of the embodiments can be made and general principles defined herein can be applied to other embodiments without departing from the scope of the present invention. Therefore, the present invention is not limited to the embodiments presented herein, but should be analyzed within the widest range which is associated with the principles and new features presented herein.

The invention claimed is:

1. An encrypting program stored in a non-transitory computer-readable medium and configured for encrypting a data value included in a data table stored in a memory and storing the encrypted data value in a persistent storage medium, wherein the encrypting program allows a computer device to perform steps including:
generating the encrypted data value based on the data value included in the data table stored in the memory;
generating a hash value that matches the encrypted data value at least partially based on the data value and positional information of the data value,
wherein the generating the hash value includes:
acquiring a column key at least partially based on meta information of the data table,
acquiring a row ID at least partially based on a position at which the data value is to be written on a data block, and
generating the hash value that matches the encrypted data value at least partially based on the data value, the column key, and the row ID, and
wherein the positional information of the data value includes at least one of the row ID or the column key; and
determining to write the encrypted data value and the hash value on the persistent storage medium,
where instructions for the encrypting program are executed by one or more processors in the computer device.

2. The encrypting program of claim 1,
wherein the steps further include:
determining to encrypt data values of one or more columns of the data table, and
the steps are performed with respect to the data values of one or more columns determined to be encrypted.

3. The encrypting program of claim 1,
wherein the steps further include: when the encrypted data value is updated,
generating a second encrypted data value based on the updated data value;
determining to store the second encrypted data value at a second position different from the position of the encrypted data value;
generating a second hash value that matches the second encrypted data value at least partially based on the updated data value and positional information of the second position; and
determining to write the second encrypted data value and the second hash value on the persistent storage medium.

4. The encrypting program of claim 1,
wherein the steps further include:
generating a check sum in a block of the persistent storage medium based on the encrypted data value and the hash value.

5. The encrypting program of claim 1,
wherein the generating the encrypted data value includes:
determining an encryption function based on encryption information included in an encryption key, and generating the encrypted data value by using the encryption function calculated based on the data value.

6. The encrypting program of claim 5,
wherein the encryption key includes at least information associated with an encryption mode, information on an encrypted data type, and a data length,
the encryption mode includes at least one of a data encryption standard (DES), a triple DES, or an advanced encryption standard (AES).

7. A method for encrypting a data value included in a data table stored in a memory and storing the encrypted data value in a persistent storage medium,
wherein a program allows a computer device to perform steps including:
generating the encrypted data value based on the data value included in the data table stored in the memory;
generating a hash value that matches the encrypted data value at least partially based on the data value and storage positional information on the persistent storage medium in which the data value is to be stored,
wherein the generating the hash value includes:
acquiring a column key at least partially based on meta information of the data table,
acquiring a row ID at least partially based on a position at which the data value is to be written on a data block, and
generating the hash value that matches the encrypted data value at least partially based on the data value, the column key, and the row ID, and
wherein the storage positional information of the data value includes at least one of the row ID or the column key; and
determining to write the encrypted data value and the hash value on the persistent storage medium,
where instructions for the program are executed by one or more processors in the computer device.

8. The method of claim 7,
wherein the steps further include: when the encrypted data value is updated,
generating a second encrypted data value based on the updated data value;
determining to store the second encrypted data value at a second position different from the position of the encrypted data value on the persistent storage medium;
generating a second hash value that matches the second encrypted data value at least partially based on the updated data value and positional information of the second position; and
determining to write the second encrypted data value and the second hash value on the persistent storage medium.

9. A database server for providing data security, the database server comprising:
one or more hardware computer processors;
a memory storing a data table including a data value;
an encryption module configured to generate an encrypted data value based on the data value;
a hash module configured to generate a first hash value that matches the encrypted data value at least partially based on the data value and positional information of the data value by:
acquiring a column key at least partially based on meta information of the data table,
acquiring a row ID at least partially based on a position at which the data value is to be written on a data block, and
generating the first hash value that matches the encrypted data value at least partially based on the data value, the column key, and the row ID, and
wherein the positional information of the data value includes at least one of the row ID or the column key,
wherein the encyption module and the hash module are software modules executed by the one or more hardware computer processors; and
a persistent storage medium in which the encrypted data value and the first hash value are written.

10. The database server for providing data security of claim 9, the database server further comprising:
where the hash module is further configured to generate a second hash value that matches the encrypted data value at least partially based on the data value and storage positional information on the persistent storage medium in which the data value is to be stored; and
where in the persistent storage medium, the encrypted data value, and the second hash value are written.

11. The database server for providing data security of claim 9, the database server further comprising:
where the encryption module is further configured to generate, when an encrypted data value is updated, a second encrypted data value based on the updated data value;
the persistent storage medium is further configured to store the second encrypted data value at a second position different from the position of the encrypted data value on the persistent storage medium;
where the hash module is further configured to generate a third hash value that matches the second encrypted data value at least partially based on the updated data value and positional information of the second position; and
where in the persistent storage medium, the second encrypted data value, and the third hash value are written.

* * * * *